Figure 1:
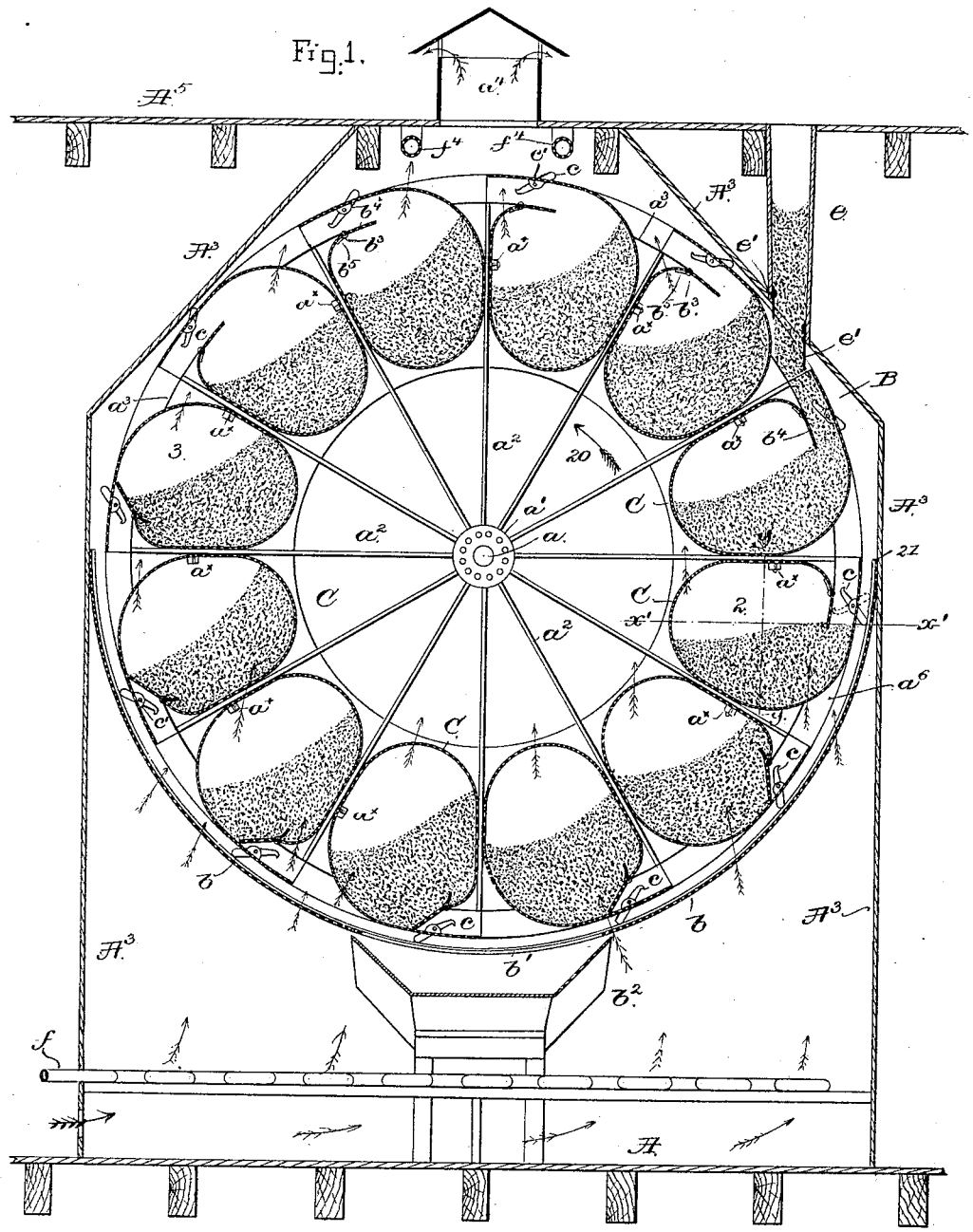

(No Model.) 2 Sheets—Sheet 1.

W. H. BAILEY.
MALT DRIER.

No. 346,344. Patented July 27, 1886.

Witnesses.
Fred L. Emery
John F. C. Prindle

Inventor.
William H. Bailey.
By Crosby & Gregory
attys.

N. PETERS, Photo-Lithographer, Washington, D. C.

(No Model.) 2 Sheets—Sheet 2.
W. H. BAILEY.
MALT DRIER.
No. 346,344. Patented July 27, 1886.
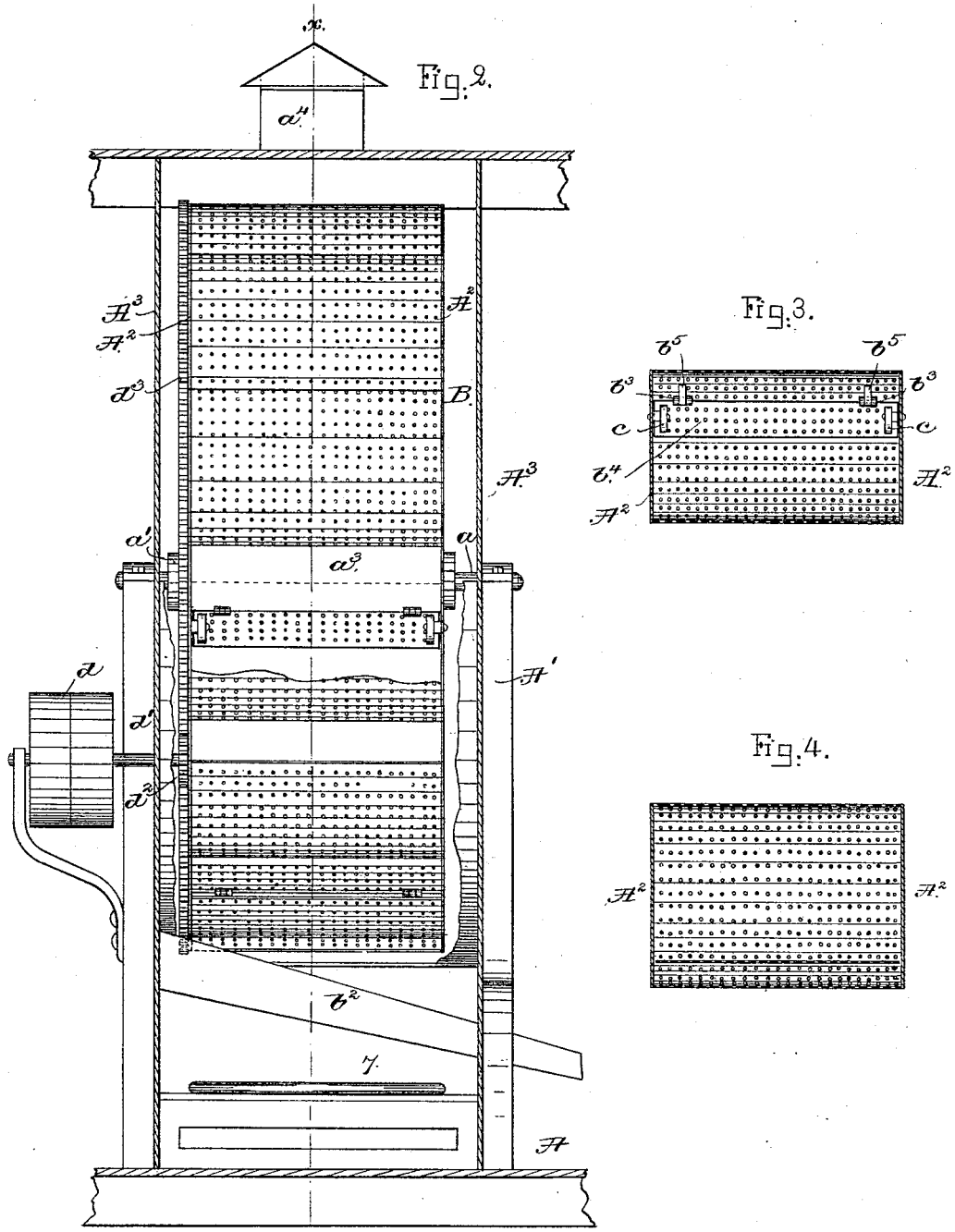
Witnesses.
Fred L. Emery.
John F. C. Prindle.
Inventor.
William H. Bailey.
by Crosby & Gregory attys.

UNITED STATES PATENT OFFICE.

WILLIAM H. BAILEY, OF WINCHESTER, ASSIGNOR TO GEORGE H. WILBUR, TRUSTEE, OF MALDEN, MASSACHUSETTS.

MALT-DRIER.

SPECIFICATION forming part of Letters Patent No. 346,344, dated July 27, 1886.

Application filed December 9, 1885. Serial No. 185,122. (No model.)

*To all whom it may concern:*

Be it known that I, WILLIAM H. BAILEY, of Winchester, county of Middlesex, State of Massachusetts, have invented an Improvement in Drying Apparatus, of which the following description, in connection with the accompanying drawings, is a specification, like letters on the drawings representing like parts.

This invention relates to an apparatus for drying cereals, fruits, &c., and is especially adapted for the treatment of grain in the production of malt, the object of the invention being to enable the grain to be uniformly and successfully germinated and then dried to form malt.

As heretofore practiced, the grain, preferably barley, is taken from the soaking pit or vat, and while saturated with water is spread over the floor of the malting-room to the depth of from six to eighteen inches and allowed to sprout or germinate. As the process of germination takes place the grain has to be frequently raked over to prevent unequal heating and premature germination, the unequal heating of the grain causing the same to sour. The germinated grain is then dried in suitable kilns.

My invention consists, essentially, of a rotating wheel or carrier provided with buckets opening at the periphery of the said wheel or carrier, for the reception of the saturated grain, and means, as will be described, whereby the said buckets may be automatically filled when the said wheel is rotated in one direction, and herein the apparatus is so constructed that the buckets may be emptied when the wheel is rotated in a reverse direction.

My invention also consists in details of construction to be hereinafter described, and pointed out in the claims.

Figure 1 is a vertical section in the line $x\ x$ of Fig. 2, representing a malting-room provided with my improved drying apparatus, the heating-pipes being in elevation; Fig. 2, a side view of Fig. 1, with part of the casing and one of the buckets broken out; Fig. 3, a sectional detail of a bucket in the line $y\ y$, looking from the left; and Fig. 4, a sectional detail of the same in the line $x'\ x'$, looking down.

The floor A supports uprights A', forming bearings for an axle, $a$, of a rotating wheel or carrier, B, to be described.

The wheel or carrier B is herein shown as composed of a hub, $a'$, a series of preferably flat spokes, $a^2$, supporting a series of stringers, $a^3$, extended axially across the said wheel, and of two annular plates or end pieces, $A^2$, one at each end of the wheel, and attached to the spokes. The wheel B is placed within a casing, $A^3$, provided at its upper portion with a ventilator, $a^4$, and having extended into it a hopper or chute, $e$, provided with flexible flaps $e'$. Within the casing $A^3$ and below the center of the wheel is a semicircular screen, $b$, of reticulated metal, provided with an opening, $b'$, below which is placed a hopper or chute, $b^2$, extended outside the said casing.

The wheel B is provided with a series of buckets, C, of reticulated metal, and of substantially the shape shown in the drawings, the said buckets being secured to the spokes $a^2$ by bolts $a^\times$ or by other suitable means, the end pieces, $A^2$, constituting the ends of the buckets, the reticulated metal being soldered or secured to the said end pieces in any usual or convenient manner.

The wheel B, herein shown, is rotated by belts on a fast belt-pulley, $d$, of a shaft, $d'$, the said shaft having a pinion, $d^2$, thereon, which engages a series of teeth, $d^3$, secured to or forming part of the end pieces, $A^2$.

Each of the buckets C, as herein shown, has a door, $b^4$, attached to it by hinges $b^5\ b^5$, one or both of which have an arm, $b^6$, which is extended beyond the door, and, acting against the inside of the bucket, prevents the door from falling into the bucket farther than represented at the upper part of Fig. 1. Each bucket is also provided with one or more dogs, $e$, pivoted to the end pieces, $A^2$, and normally occupying the full-line position shown in Fig. 1, the outer end of each of the said dogs being heavier than its inner end.

The grain from the soaking-vat, which is preferably located in the room above the apparatus, is fed through the chute $e$, and the wheel B being rotated in the direction of the arrow 20, the said grain flows into each bucket as it passes beneath the chute $e$, the door $b^4$ of each bucket being kept open by gravity, as shown in the upper half of Fig. 1, until, in the further rotation of the said wheel, gravity and the weight of the grain close the said door, as indicated at the left in Fig. 1 by the bucket marked 3. The wheel B is rotated until each bucket contains the proper amount of grain, and thereafter the said wheel is stopped or but slowly rotated to allow the said grain to germinate sufficiently. In case the heat due to germination becomes too great the wheel may be rotated sufficiently to turn over the grain in the bucket to prevent souring. The grain having been germinated and then cooled to such a degree that the action of heated air will not again start the germination, the wheel is set in motion and air is admitted into the casing $A^3$ and heated by means of steam-pipes $f$, or in other usual manner commonly practiced for heating chambers or rooms, and the said heat is continued and brought to such degree as to thoroughly dry the grain, the rotation of the wheel and the tumbling of the grain effecting the thorough drying of the same without lumps or cakes. After the grain has become thoroughly dried the wheel B is rotated in a direction reverse to that indicated by the arrow 20, and the heavy end of each dog $c$ in its turn strikes against the end 21 of the screen $b$, throwing the said dog into the dotted-line position shown in the bucket marked 2, causing the inner end of the said dog to hold open the door $b^4$, the same being opened by gravity, so that the dried grain may fall from its bucket through the opening $b'$ of the screen $b$ and into the hopper or chute $b^2$.

If it is desired to moisten the grain during germination, water may be allowed to issue from perforated pipes $f^4$, located above the wheel B, and connected with any usual water-supply.

The hopper or chute $b^2$ may be replaced by any usual or suitable conveyer—such as a belt or screw—whereby the grain is carried away as it falls from the buckets.

It will be noticed that the stringers shown in the drawings are situated between adjacent buckets, and extend from the back of one to the opening of the succeeding bucket, the said stringers being secured to the spokes $a^2$.

The stringers $a^3$, as the wheel is rotated in the direction of the arrow 20, receives upon it the grain as it issues from the hopper $e$, and directs the course of the same into the buckets, the said stringers forming a bridge between adjacent buckets.

I claim—

1. In an apparatus for drying cereals, fruits, &c., a rotating wheel or carrier having buckets located at or near the periphery of the said wheel or carrier and normally open when passing the chute, combined with a casing and with the chute and its valves, through which to fill the said buckets, substantially as described.

2. In an apparatus for drying cereals, fruits, &c., a rotating wheel or carrier having buckets located at or near the periphery of the said wheel and normally open when passing the chute, and pivoted doors which are opened by gravity and closed by the weight of the grain, combined with a casing and a chute, $e$, substantially as described.

3. In an apparatus for drying cereals, fruits, &c., a rotating wheel or carrier having buckets C, located at or near the periphery of the said wheel or carrier, and provided with doors $b^4$, combined with dogs, and means, substantially as described, to trip the said dogs and hold open the said doors, for the purpose specified.

4. The rotating wheel B, its attached buckets C, provided with doors $b^4$, and the dogs $c$, carried by the said wheel, combined with the screen $b$, surrounding a portion of the said wheel, and having an opening, $b'$, and with the hopper $b^2$, substantially as described.

5. The wheel B and buckets C, provided with doors $b^4$ and dogs $c$, combined with the casing $A^3$, chute $e$, ventilator $a^4$, and pipes $f$, to furnish heat to the said casing, substantially as described.

6. The wheel B, having buckets C, provided with doors $b^4$, and the stringers $a^3$, located between each bucket, combined with the chute $e$, substantially as described.

In testimony whereof I have signed my name to this specification in the presence of two subscribing witnesses.

WILLIAM H. BAILEY.

Witnesses:
G. W. GREGORY,
J. H. CHURCHILL.